United States Patent [19]

Aillet et al.

[11] Patent Number: 4,659,468

[45] Date of Patent: Apr. 21, 1987

[54] FILTERING COLUMN FOR FILTERING HEAVY FUELS UNDER PRESSURE AT HIGH TEMPERATURE

[75] Inventors: Guy Aillet, Franconville; Jacques Ecabert, Montmorency, both of France

[73] Assignee: Societe D'Exploitation des Establissements Rellumix, Paris, France

[21] Appl. No.: 425,618

[22] Filed: Sep. 28, 1982

[51] Int. Cl.$^4$ .............................................. B07B 23/00
[52] U.S. Cl. .............................. 210/352; 210/416.4; 210/338; 210/346; 210/488; 210/498
[58] Field of Search ............... 210/323.2, 416.4, 457, 210/483, 488, 172, 338, 346, 315, 356, 498, 350

[56] References Cited

U.S. PATENT DOCUMENTS 4,402,829  9/1983  Cordua ............................ 210/488

FOREIGN PATENT DOCUMENTS 244111  12/1924  United Kingdom .
695739   4/1951  United Kingdom .

Primary Examiner—Andrew H. Metz
Assistant Examiner—Sharon T. Cohen
Attorney, Agent, or Firm—Kane, Dalsimer, Sullivan, Kurucz

[57] ABSTRACT

The filtering column is of the type comprising a perforated hollow metal tubular body (11) around which is disposed a stack (20) of metal rings (27) having deformations forming spacing elements and defining therebetween filtering interstices. The rings (27) have an inside diameter exceeding the outside diameter of the tubular body (11) so as to define between the inner periphery of each ring and the outer periphery of the tubular body a limited radial clearance (26) which does not exceed the elastic limit of each individual ring. The rings (27) constitute a stack (20) retained axially on the hollow body (11) in an undetachable manner with an axial clearance exceeding the aforementioned radial clearance.

8 Claims, 2 Drawing Figures

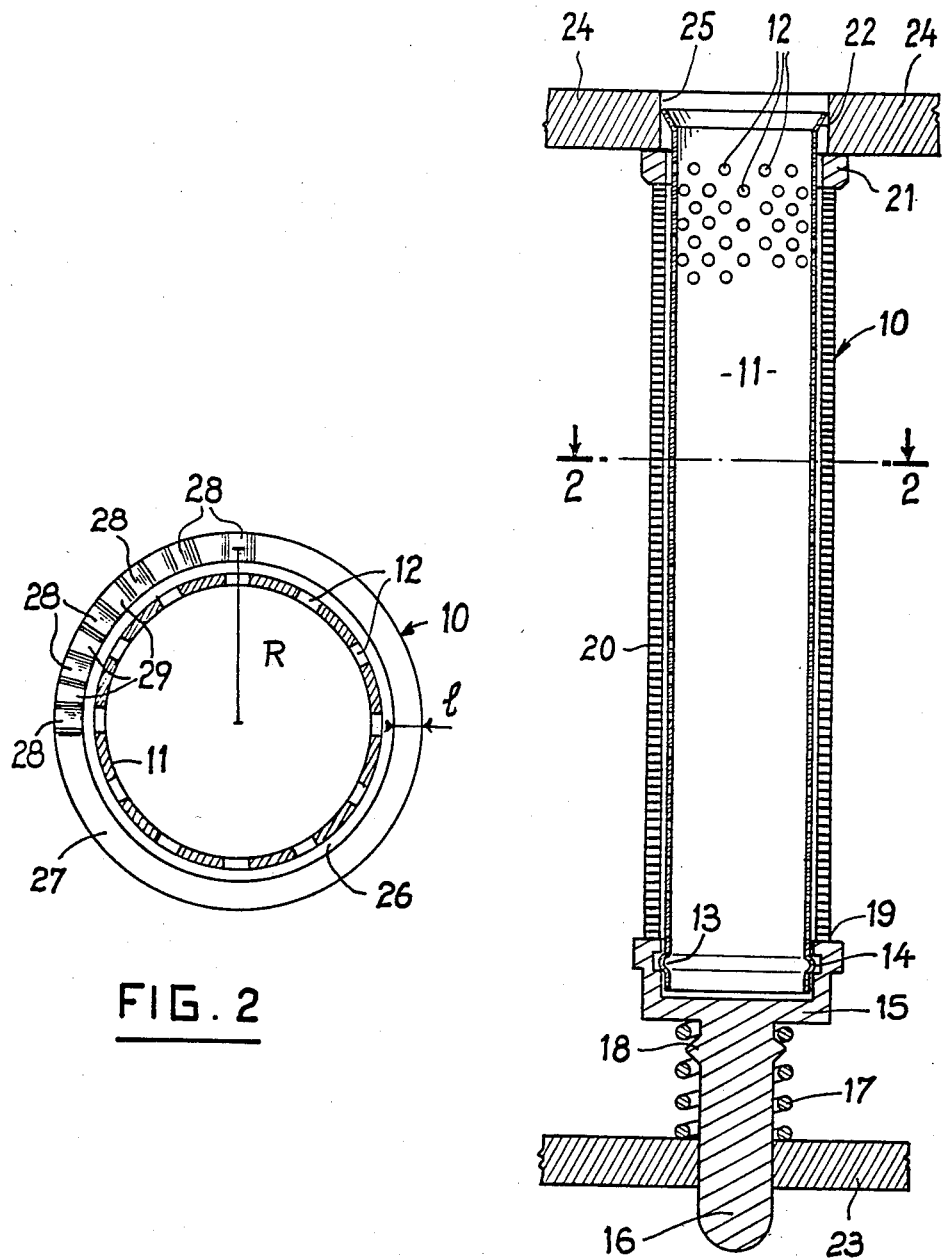

FILTERING COLUMN FOR FILTERING HEAVY FUELS UNDER PRESSURE AT HIGH TEMPERATURE

The present invention generally relates to the filtration of fuels and more particularly to a filtering element for filtering heavy fuels.

At the present time, there is an increasing tendency, owing to the oil crisis, to employ heavy fuels which are more abundant and cheaper but have a very high viscosity.

Consequently, if these fuels are to be employed, they must be heated to high temperatures, at least of the order of 120°, so as to put these fuels in proper condition and permit their passage in injection pumps of Diesel engines.

This high temperature also considerably increases the chemical agressivity of these fuels.

For these reasons, increasing difficulties are experienced in the filtering of the heavy fuel-oil at high temperatures and high pressures. Apparatus of a practical type for filtering these fuels usually comprise enclosures divided into two compartments by a partition wall including a circular row of apertures, and hollow tubular filtering elements or filtering columns fixed in one of the compartments by one open end on each of the apertures, the fuel being supplied at high temperature and under pressure to one of said compartments and being received in the other compartment after having filtered through the walls of the hollow filtering columns.

These apparatus are usually equipped with means for the automatic regeneration of the filtering columns. These means are adapted to apply a sudden counter-pressure successively on each filtering column so as to dislodge the impurities retained in the interstices of the wall of the column, thereby subjecting this wall to severe stresses.

Filtering columns employed heretofore are essentially of two types. In the first type, the filtering wall comprises a thin wire gauze. In certain cases, it is also possible to employ a textile thread gauze or cloth.

The filtering columns of this type are fragile and do not resist well the stresses applied thereto in apparatus employing an automatic regeneration. They are also easily damaged when they are dismantled for cleaning.

In a second type of filtering columns, there is employed a stack of rings maintained clamped together, each ring including hollow portions and projecting portions in alternating relation and disposed in confronting relation to each other or offset from each other between the ring and thereby forming interstices through which the liquid filters.

This type of filtering column has been known for a long time and British Pat. No. 244 111 describes in particular a method for manufacturing the rings employed for such columns.

British Pat. No. 695 739 describes a filtering column comprising rings of the same type, these rings including alternating grooves and raised bearing portions, the grooves having edges which are convergent inwardly of the ring and the raised portions separating the grooves having edges which are parallel to each other equally spaced apart on each side of a median axis located on a radius of said ring and parallel to said radius.

These rings comprise a flange whereby they are maintained centered inside a perforated support tube.

In the filtering columns of this type, the rings were for a long time made from metal and have a width, ie. the difference between their inner and outer diameters, which was rather large, the grooves thus having also a great length producing a high pressure drop and, as their inside diameter was small, the filtering columns formed by such rings did not allow a sufficient flow for fuel filtering apparatus, since the sole means for increasing the flow resides in increasing the number of columns and thus resulting in apparatus which are extremely space consuming.

Further, the length of the grooves renders an automatic clearing of the filter difficult and this operation must be carried out by dismantling each column so as to separate the rings and clean them before putting them back in position with the inherent risk of inversion of the position of the rings and loss of the latter.

In order to obtain a higher flow, the width of the rings was reduced and this gave rise to problems owing to the considerable fragility of the rings constructed in this way, since any ring accidentally twisted cannot resume its original shape and thus adversely affects the properties of the filtering column.

These rings were also made from a plastics material, eg. by injection moulding. However, while such rings are capable of resuming their initial shape after deformation, their resistance to the severe conditions, in particular of temperature, prevailing in fuel filters has been found to be extremely limited owing to their small width and thickness.

Consequently, filters of plastics material such as those employed for filtering lighter fuels cannot be employed for the filtering columns.

An object of the invention is to overcome these drawbacks and to provide a filtering column, in particular for a filtering apparatus employing an automatic regeneration of the aforementioned type, which has the greatest possible number of filtering interstices relative to its area, which is extremely strong and undeformable while allowing high flows with an excellent performance under the conditions of filtration of heavy fuels, and has a very long life.

The invention consequently provides a filtering column for filtering heavy fuels under pressure and at high temperature, of the type comprising a perforated hollow metal tubular body around which is disposed a stack of metal rings having deformations forming spacer means and defining therebetween filtration interstices, wherein said rings have an inside diameter exceeding the outside diameter of the perforated hollow tubular inner body so as to define between the inner periphery of each ring and the outer periphery of said tubular body a limited radial clearance which does not exceed the possible extent of deformation within the elastic limit of each individual ring, said ring constituting a stack which is axially retained on said tubular body in an undetachable manner with an axial clearance exceeding said radial clearance.

According to another feature of the invention, the radial clearance between the rings and the perforated tubular body is between 0.3 to 0.5 mm.

Further features and advantages of the invention will be apparent from the ensuing description which is given solely by way of example with reference to the accompanying drawing in which:

FIG. 1 is an axial sectional view of a filtering column according to the invention;

FIG. 2 is a sectional view taken along line 2—2 of FIG. 1.

With reference to the drawing, FIG. 1 shows a filtering column according to the invention generally designated by the reference numeral 10 and comprising a hollow tubular central body 11 of metal having perforations 12 and having at one end a peripheral bead 13 for retaining the tubular body 11 in a groove 14 of a closed socket 15 which includes an axial depending portion 16 around which a compression coil spring 17 is disposed and advantageously retained on the portion 16 by means of a projection 18.

A stack of rings 20 disposed around the body 11 bears against a peripheral flange 19 of the socket 15 and is maintained on the body 11 by means of a massive metal annular ring 21. The corresponding end portion of the body 11 is deformed outwardly on its periphery as shown at 22 so as to prevent the ring 21 from escaping.

The annular ring 21 is slidably mounted on the body 11. The stack of rings 20 has a length which is less than that of the body 11, measured between the annular bead 13 and the deformed portion 22, so that the rings 20 have an axial clearance.

The filtering column described hereinbefore is disposed in the known manner between two walls 23, 24 of a heavy fuel filtering apparatus, the depending portion 16 being inserted in a complementary aperture in the wall 23 while the enlarged end portion 22 of the body is inserted in an aperture 25 in the upper wall 24 of the filtering apparatus, the inner edge of the aperture 25 bearing against the upper face of the ring 21 and the spring 17 applying this ring elastically against the wall 24 in the conventional manner.

As can be seen in the drawing, and in particular in FIG. 2, the inside diameter of the rings 27 exceeds the outside diameter of the body 11 and defines with the latter a radial clearance or gap 26.

According to the illustrated embodiment, the rings 27 are of the type described in the British Pat. No. 244 111 and have raised bearing portions 28 having edges which are parallel to each other and are equally spaced from and on each side of axes located on radii R of the ring and defining therebetween grooves 29 having edges which are convergent inwardly of the ring.

The Applicant has found by Trials that a roughly ideal filtering surface permitting a maximum flow can be obtained by means of annular rings whose width 1, ie. the difference between their inside and outside diameters, is of the order of 1.5 mm, the rings having between 160 and 200 grooves and preferably 180 grooves per ring, the width of the projecting portions, measured between their parallel edges, being between 210 and 250 microns and preferably 230 microns, while the depth of each groove may be about 40 microns with a total thickness of the ring of 3/10 mm and the ratio between the height and the width of the groove being 1 to 5 while the ratio between the height of the groove and the thickness of the ring is 1 to 7.

Owing to their very small width and thickness, these rings are very easily deformable. In order to overcome this drawback, according to the invention, the radial clearance between the inside diameter of the rings and the outside diameter of the tubular body 11 is limited so as to be less than the limit of the elastic deformation of the rings. In respect of rings having the aforementioned characteristics, this clearance is preferably between 0.3 to 0.5 mm, which enables the rings to move relative to each other and relative to the body 11 when the stop ring 21 which retains them is shifted toward the flange 22 at the end of the body when the column is dismantled, while enabling them to conserve a cohesion which imparts thereto a high overall resistance to blows and to deformation.

Advantageously, the free length of the body 11 between the flange 22 and the ring 21 is about 1 cm so that it is possible to detach the rings 27 from each other when the filtering column is withdrawn from the filtering apparatus.

This enables a complete clearing and cleaning operation to be carried out on the rings 27 which are slightly spaced apart from each other without withdrawing these rings from the filtering column, so that any risk of damage to the rings or any positioning error is avoided.

Owing to this arrangement, and in particular to the radial clearance less than the elastic limit of the rings 27, the filtering column according to the invention constitutes a substantially undeformable unseparable assembly.

It will of course be understood that the axial clearance of the rings 27 on the body is only limited by considerations of overall size, and the rings 27 can only assume, relative to the axis of the body 11, an angular position limited by the clearance 26.

It will also be understood that, when the filtering columns are dismantled from the filtering apparatus, the stack of rings may be cleaned very simply and very effectively owing to their small size, in a conventional manner by dipping in a solvent and drying by means of a jet of gas under pressure, the stack of rings moreover resisting very well the automatic clearing operations by application of a counter-pressure.

We claim:

1. A filtering column structure for filtering heavy fuels under pressure and at high temperature, said column structure comprising a perforated hollow metal tubular body having a longitudinal axis, a stack of metal rings disposed around the hollow body and having deformations which form spacing means and define therebetween filtering interstices, said rings having an inside diameter exceeding the outside diameter of the hollow body so as to define between an inner periphery of each ring and an outer periphery of said hollow body a limited radial clearance which allows radial play and deformation only within the elastic limit of each individual ring, and retaining means for axially retaining the stack of rings on said hollow body in an undetachable manner with axial clearances allowing axial play between adjacent rings exceeding said radial clearance, said retaining means comprising a first element mounted on the tubular body in axially fixed relation to the tubular body and a second element axially movably mounted on the tubular body, and means permanently retaining said second element on the tubular body and allowing said axial movability thereby insuring said axial play.

2. A filtering column structure according to claim 1, wherein said radial clearance is between 0.3 and 0.5 mm.

3. A filtering column structure according to claim 1, wherein said deformations comprise grooves the ratio between the height and the width of a groove being between 1/5 and 1/6, the width of the rings being advantageously about 1.5 mm.

4. A filtering column structure according to claim 3, wherein the ratio between the depth of a groove and the thickness of the ring 1 to 7.

5. A filtering column structure according to any one of the claims 1 to 4, wherein each ring comprises a number of grooves of between 160 and 200, the width of each bearing portion having parallel edges being between 210 to 250 microns.

6. A filtering column structure according to claim 5, wherein the number of grooves in each ring is 180.

7. A filtering column structure according to any one of the claims 1 to 4, wherein said first element is a closed socket constituting a fixed abutment for the stack of rings, said second element is a massive metal ring.

8. A filtering column structure according to claim 7, wherein a radially outward deformation of the periphery of an end portion of the hollow body constitutes said retaining means.

* * * * *